United States Patent [19]
Hase

[11] 3,905,041
[45] Sept. 9, 1975

[54] OPERATING DEVICE FOR MAGNETIC RECORDING AND REPRODUCING APPARATUS

[75] Inventor: Kohichi Hase, Tokyo, Japan

[73] Assignee: Trio Electronics Incorporated, Tokyo, Japan

[22] Filed: Feb. 1, 1974

[21] Appl. No.: 438,638

[30] Foreign Application Priority Data

Feb. 6, 1973 Japan ............................. 48-14886

[52] U.S. Cl. ............................................. 360/62
[51] Int. Cl. ........................................ G11b 15/12
[58] Field of Search ............ 360/61, 62, 67, 69, 75, 360/60

[56] References Cited

UNITED STATES PATENTS

| | | | |
|---|---|---|---|
| 3,641,277 | 2/1972 | Campbell et al. | 360/60 |
| 3,728,494 | 4/1973 | Kobler et al. | 360/60 |

*Primary Examiner*—Vincent P. Canney
*Attorney, Agent, or Firm*—Charles E. Pfund, Esq.

[57] ABSTRACT

In a control device for operating recording-reproducing switching means and a constant speed running device in response to a recording operation signal and a constant speed running operation signal which are produced by manipulating various operating buttons of a magnetic recording and reproducing apparatus, AND gate circuits, flip-flop circuits, an OR gate circuit and NOT circuits are combined such that when the recording operation signal and the constant speed running operation signal are simultaneously generated the recording-reproducing switching means and the constant speed running device are simultaneously operated, such that when said two signals are generated with a time difference only the constant speed running device is operated, and such that when only the recording operation signal is generated only the recording-reproducing switching means is operated and further that when only the constant speed running operation signal is generated only the constant speed running device is operated.

3 Claims, 1 Drawing Figure

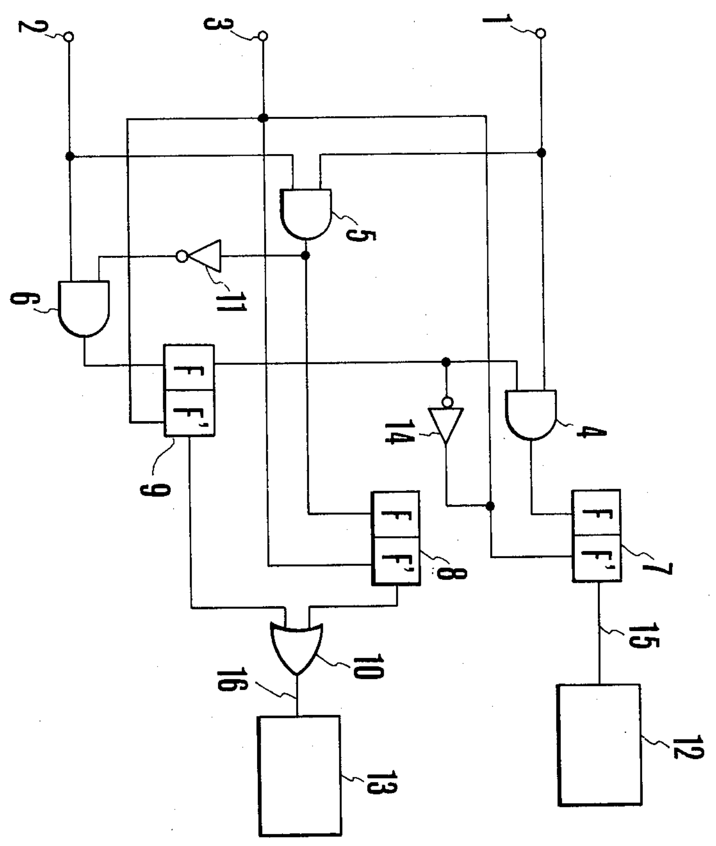

OPERATING DEVICE FOR MAGNETIC RECORDING AND REPRODUCING APPARATUS

BACKGROUND OF THE INVENTION

This invention relates to an operating device for magnetic recording and reproducing apparatus.

In a prior art magnetic recording and reproducing apparatus, such as a tape recorder, wherein various operations of the recorder are electrically controlled by using operating buttons which actuate microswitches or the like, usually called feather touch operated switches. When the recording button alone is depressed the circuit is maintained in the recording condition and when the reproducing button, that is a constant speed operation button, is depressed the circuit is changed to the reproducing condition without cancelling the recording condition. Accordingly, when the operator tries to reproduce the tape without being aware of the fact that the circuit is maintained in the recording condition which is caused by an inadvertent touching of the recording button or when the recording condition is not properly indicated due to failure of a lamp adapted to indicate the recording condition, information recorded on a running tape will be erased because the tape is driven under the recording condition. Furthermore, when the reproducing button is depressed while the tape is running for reproduction, the circuit condition will be changed to the recording condition so that the recorded information is erased in the same manner as described above.

SUMMARY OF THE INVENTION

It is an object for this invention to provide an improved operating apparatus of a magnetic recording and reproducing apparatus capable of eliminating various difficulties described above.

According to this invention, this object can be accomplished by providing an operating device for a magnetic recording and reproducing apparatus comprising a first input line for receiving a recording operation signal, a second input line for receiving a constant speed running operation signal, a first output line for transmitting a recording-reproducing switching signal, a second output line for transmitting a constant speed running signal, means for producing the recording-reproducing switching signal and the constant speed running signal on the first and second output lines, respectively, when the recording operation signal and the constant speed running operation signal are supplied simultaneously to the first and second input lines respectively, means for producing only the constant speed running signal on the second output line when the recording operation signal and the constant speed running operation signal are applied with a time difference to the first and second input lines respectively, means for producing only the recording-reproducing switching signal on the first output line when only the recording operation signal is applied to the first input line, means for producing only the constant speed running signal on the second output line when only the constant speed running operation signal is applied to the second input line, recording-reproducing switching means connected to the first output line, and a constant speed running device connected to the second output line.

The means described above are comprised by a unique combination of AND gate circuits, flip-flop circuits, NOT circuits and an OR gate circuit so that it is possible to fabricate the operating device as a compact unit.

BRIEF DESCRIPTION OF THE DRAWING

A single FIGURE of the accompanying drawing shows a connection diagram of an operating device embodying the invention and used to control a tape recorder.

DESCRIPTION OF THE PREFERRED EMBODIMENT

The operating device shown in the accompanying drawing comprises a first input line 1 connected to receive a recording operation signal which is generated when a recording button, not shown, of a magnetic recording and reproducing apparatus is operated, the input line 1 being connected to the inputs of AND gate circuits 4 and 5. The other input of AND gate circuit 4 is connected to the output of one unit F of a flip-flop circuit 9 and the output of the AND gate circuit 4 is coupled to the input of one unit F of a flip-flop circuit 7. To the output of the other unit F′ of flip-flop circuit 7, that is to the first output line 15 is connected switching means 12 responsive to a recording-reproducing switching signal for switching the amplifier circuit, an equalizer, etc., not shown, of the tape recorder between the recording condition and the reproducing condition. To the output of unit F of the flip-flop circuit 9 is also connected the input of a NOT circuit 14 and the output thereof is connected to the input or the reset signal input of the unit F′ of the flip-flop circuit 7.

There is also provided a second input line 2 which is connected to receive a constant speed running operation signal which is generated when a reproducing button or a constant speed running button, not shown, is operated. This input line 2 is connected to one of respective inputs of AND gate circuits 5 and 6, the output of the AND gate circuit 5 being connected to respective inputs of a unit F of the flip-flop circuit 8 and of a NOT circuit 11, the output thereof being connected to the other input of the AND gate circuit 6. The output of the AND gate circuit 6 is connected to the input of the unit F of the flip-flop circuit 9. The output of the other unit F′ of the flip-flop circuit 9 is connected to one input of an OR circuit 10, the other input thereof being connected to the output of unit F′ of the flip-flop circuit 8. The output of the OR circuit 10, that is the second output line 16 is connected to a constant speed running device 13 which is connected to be operated by the constant speed running signal appearing on the second output line 16. In this circuit, when the tape recorder is not operated, the units F of respective flip-flop circuits are maintained in their "1" state whereas the units F′ in their "0" state. A reset signal circuit 3 is connected to the inputs of units F′ of respective flip-flop circuits.

The control circuit described hereinabove operates as follows. When the recording button is depressed under the pre-operative condition, the recording operation signal is applied to the AND gate circuits 4 and 5 through the first input line 1. However, since there is no input, to the other input AND gate circuit 5 does not operate and only the AND gate circuit 4 operates to produce a "1" output because the unit F of the flip-flop circuit 9 is in the "1" state. The "1" output from the AND gate circuit 4 causes an inversion of the flip-flop circuit 7. Accordingly, unit F′ of this flip-flop circuit assumes "1" state which is applied to switching means 12 as the recording-reproducing switching signal via the first output line 15, thus causing the switching means to switch various circuits of the tape recorder to the recording condition. Since the flip-flop circuit 7 is of the SR type, even when the recording button is released the circuits are maintained in the recording condition until a next signal is supplied. When the tape recorder is operated to run at a constant speed under these conditions, a constant speed running operation signal is applied to the inputs of the AND gate circuits 5 and 6 through the second input circuit 2. However, as the recording button has already been released the first input circuit 1 does not supply any signal to the AND gate circuit 5 so that this AND gate circuit will not be enabled. As a result, there is no output from AND gate circuit 5 so that the NOT circuit 11 produces a "1" output to enable the AND gate circuit 6, thus producing a output "1." In response to this "1" output the flip-flop circuit 9 inverts its state, whereby units F and F′ of flip-flop circuit 9 produce "0" and "1" outputs respectively. Accordingly, the NOT gate circuit 14 connected to the output of unit F of the flip-flop circuit 9 produces a "1" output which is applied to unit F′ of the flip-flop circuit 7 as a reset signal thus inverting the state thereof. As a result, the unit F′ of this flip-flop circuit produces "0" output so that the switching means 12 is made inoperative through the first output line 15, thus releasing the recording condition of the circuits of the tape recorder. As above described, since the unit F′ of flip-flop circuit 9 produces a "1" output the OR gate circuit 10 is operated to produce an output which is applied to the constant speed running device 13 as a constant speed running signal via the second output line 16, thereby running the tape under the reproducing condition.

If the recording button is depressed under these conditions, although the recording operation signal is applied to the inputs of AND gate circuits 4 and 5 in the same manner as above described, since the constant speed running operation button is now released, no signal is applied to the other input of AND gate circuit 5. Consequently, this AND gate circuit is not enabled. Further, since the units F and F′ of the flip-flop circuit 9 still provide outputs "0" and "1", respectively, AND gate circuit 4 does not produce any output. Consequently, the circuits for recording and reproducing are not changed to the recording condition thereby continuing to maintain the reproducing condition. When the recording operation signal and the constant speed running operation signal are supplied simultaneously, since these two signals are applied to both inputs of the AND gate circuit 5, this AND gate circuit is enabled to produce an output which inverts the state of the flip-flop circuit 8. Thus, the units F and F′ of this flip-flop circuit produce "0" and "1" outputs respectively and the latter output enables the OR gate circuit 10 which produces the constant speed running signal thereby operating the constant speed running device 13 through the second output line 16. The AND gate circuit 5 enabled as above described produces an output "1." In response to this output the NOT circuit 11 produces a "0" output thereby disenabling the AND gate circuit 6. Accordingly, the flip-flop circuit 9 is not inverted and its units F and F′ still produce outputs "1" and "0" respectively. Thus, both inputs of the AND gate circuit 4 are supplied with signals to enable this AND gate circuit 4. As a result, in response to the output from this AND gate circuit 4, the state of the flip-flop circuit 7 is inverted and the "1" output of the unit F′ thereof is applied to the switching means 12 as the recording-reproducing switching signal through the first output line 15. As a result, the switching means 12 is operated to render various circuits to assume the recording condition. Thus, since the first and second output lines produce outputs the tape is run, thus assuming the recording condition. To stop the operation of the tape recorder, a reset signal is applied via the reset signal circuit 3 for inverting respective flip-flop circuits thus interrupting the outputs to the switching means 12 and the constant speed running device 13. Accordingly, the operation of the tape recorder is stopped.

According to this invention, in a tape recorder in which various operations are performed electrically by manipulating operating buttons in the form of feather touch type microswitches, when a reproducing button is depressed while the tape recorder is maintained in the recording condition by the operation of a recording button it is possible to immediately commence the recording operation. For this reason, it is possible to prevent the defect of erasing the information which has been recorded on the tape by inadvertently depressing the reproducing button due to the failure of an indicating lamp which is used to display the recording condition or an accidental touch to the recording button. Furthermore, in accordance with this invention, even when the recording button is depressed during the reproducing operation, it is possible to positively prevent changing the recorder to the recording condition so that there is no fear of erasing the recorded information. Although the aforementioned embodiment has been described in terms of a tape recorder, it will be clearly understood that the operating device of this invention can also be applied to such other magnetic recording and reproducing apparatus as a video tape recorder, a magnet drum type recorder and the like.

What is claimed is:

1. An operating device of a magnetic recording and reproducing apparatus comprising a first input line for receiving a recording operation signal, a second input line for receiving a constant speed running operation signal, a first output line for transmitting a recording-reproducing switching signal, a second output line for transmitting a constant speed running signal, means for producing said recording-reproducing signal and said constant speed running signal on said first and second output lines respectively, when said recording operation signal and said constant speed running operation signal are supplied simultaneously to said first and second input lines respectively, means for producing only said constant speed running signal on said second output line when said recording operation signal and said constant speed running operation signal are applied with a time difference to said first and second input lines respectively, means for producing only said recording-reproducing switching signal on said first output line when only said recording operation signal is applied to said first input line, means for producing only said constant speed running signal on said second output line when only said constant speed running signal is applied to said second input line, recording-reproducing switching means connected to said first output line and a constant speed running device connected to said second output line.

2. An operating device of a magnetic recording and reproducing device comprising a first input line for receiving a recording operation signal, a second input line for receiving a constant speed running operation signal, recording-reproducing switching means, a constant speed running device, a first AND gate circuit with one input connected to said first input line, a first flip-flop circuit connected between the output of said first AND gate circuit and said recording-reproducing switching means, a second AND gate circuit with its two inputs respectively connected to said first and second input lines, a second flip-flop circuit connected to the output of said second AND gate circuit, a third AND gate circuit with one input connected to said second input line, a first NOT circuit connected between the output of said second AND gate circuit and the other input of said third AND gate circuit, a third flip-flop circuit connected between the output of said third AND gate circuit and the other input of said first AND gate circuit, an OR gate circuit with its two inputs respectively connected to the outputs of said second and third flip-flop circuits and its output connected to said constant speed running device, a third input line for applying a reset signal to each one of said three flip-flop circuits, and a second NOT circuit connected between said third input line and the other input of said first AND gate circuit.

3. The operating device according to claim 2 wherein said second and third flip-flop circuits are of the SR type.

* * * * *